US009558490B2

(12) United States Patent
Gerard et al.

(10) Patent No.: US 9,558,490 B2
(45) Date of Patent: Jan. 31, 2017

(54) SYSTEMS AND METHODS FOR PREDICTING A MERCHANT'S CHANGE OF ACQUIRER

(71) Applicant: MasterCard International Incorporated, Purchase, NY (US)

(72) Inventors: Jean-Pierre Gerard, Croton-On-Hudson, NY (US); Po Hu, Norwalk, CT (US)

(73) Assignee: MasterCard International Incorporated, Purchase, NY (US)

( * ) Notice: Subject to any disclaimer, the term of this patent is extended or adjusted under 35 U.S.C. 154(b) by 13 days.

(21) Appl. No.: 14/186,196

(22) Filed: Feb. 21, 2014

(65) Prior Publication Data

US 2015/0242846 A1 Aug. 27, 2015

(51) Int. Cl.
*G06Q 40/00* (2012.01)
*G06Q 20/38* (2012.01)
*G06Q 20/02* (2012.01)
*G06Q 20/20* (2012.01)

(52) U.S. Cl.
CPC ............ *G06Q 20/38* (2013.01); *G06Q 20/027* (2013.01); *G06Q 20/20* (2013.01); *G06Q 20/389* (2013.01); *G06Q 40/00* (2013.01)

(58) Field of Classification Search
CPC ........ G06Q 10/00; G06Q 20/00; G06Q 30/00; G06Q 40/00
USPC ....................................................... 705/3–44
See application file for complete search history.

(56) References Cited

U.S. PATENT DOCUMENTS

| 7,364,068 | B1* | 4/2008 | Strubbe et al. ............... 235/376 |
| 7,540,408 | B2* | 6/2009 | Levine et al. ................ 235/379 |
| 8,249,916 | B2* | 8/2012 | Gworek ...................... 705/7.35 |
| 8,315,909 | B1* | 11/2012 | Barker .......................... 705/16 |
| 2005/0222906 | A1* | 10/2005 | Chen ............................ 705/14 |
| 2009/0070182 | A1* | 3/2009 | Eder ............................... 705/8 |
| 2010/0299208 | A1* | 11/2010 | Carlson et al. ............ 705/14.64 |
| 2011/0029458 | A1* | 2/2011 | Gworek ....................... 705/400 |
| 2011/0054904 | A1* | 3/2011 | Fenton ......................... 704/270 |
| 2013/0132163 | A1* | 5/2013 | Eder ............................ 705/7.37 |

* cited by examiner

*Primary Examiner* — Frantzy Poinvil
(74) *Attorney, Agent, or Firm* — Buckley, Maschoff & Talwalkar LLC

(57) ABSTRACT

According to some embodiments, an acquiring party prediction platform may receive transaction information about a plurality of transactions associated with a merchant, and different transactions may be associated with different acquiring parties. The transaction information may be analyzed to generate a prediction that a particular acquiring party may be associated with a transaction volume below a threshold volume in the future. An indication associated with the prediction may then be transmitted.

21 Claims, 10 Drawing Sheets

SYSTEMS AND METHODS FOR PREDICTING A MERCHANT'S CHANGE OF ACQUIRER

BACKGROUND

A merchant may process payment transactions through an acquiring bank. For example, a pharmacy that sells goods and/or services to customers might process tens of thousands of credit and/or debit card transactions on a daily basis through an acquiring bank. Moreover, different acquiring banks and merchants may have different agreements regarding processing fees, performance goals, etc. To encourage competition, a merchant may process payment transactions via a number of different acquiring banks.

In some cases, a merchant may add a new acquiring bank to the group of acquiring banks it uses to process payment transactions. Similarly, a merchant might remove an existing bank from the group of acquiring banks it uses. An acquiring bank might be interested in determining if it likely to be removed from the merchant's group in the near future (e.g., in which case, the acquiring bank might negotiate different processing fees with that merchant to avoid such a result). Note, however, that the share of transactions processed by different acquiring banks may vary over time. In addition, the overall number of transactions processed by a merchant may vary over time. Because of these fluctuations, it can be difficult for an acquiring bank to predict when a merchant is likely to stop using it to process payment transactions in the near future. As a result, systems and methods to facilitate an efficient and accurate generation of such predictions may be desired.

DETAILED DESCRIPTION

A payment network, such as a credit card or debit card payment network, may use a "merchant acquiring" process to enable merchants to accept credit and debit card payments. The services provided by acquiring banks to merchants may include the capturing, authorization, and processing of card payment transactions as goods and services are sold to customers. The acquiring bank may then settles funds back to the merchant from the cardholder and issuer via a relevant card network. In some cases, merchants may have relationships with multiple acquiring banks to create competition and lower merchant discount rates. It would therefore be desirable to provide accurate, efficient systems and methods to allow acquiring banks to predict the likelihood that a merchant will stop using one acquiring bank while still using other acquiring banks in the future.

Figure 1:
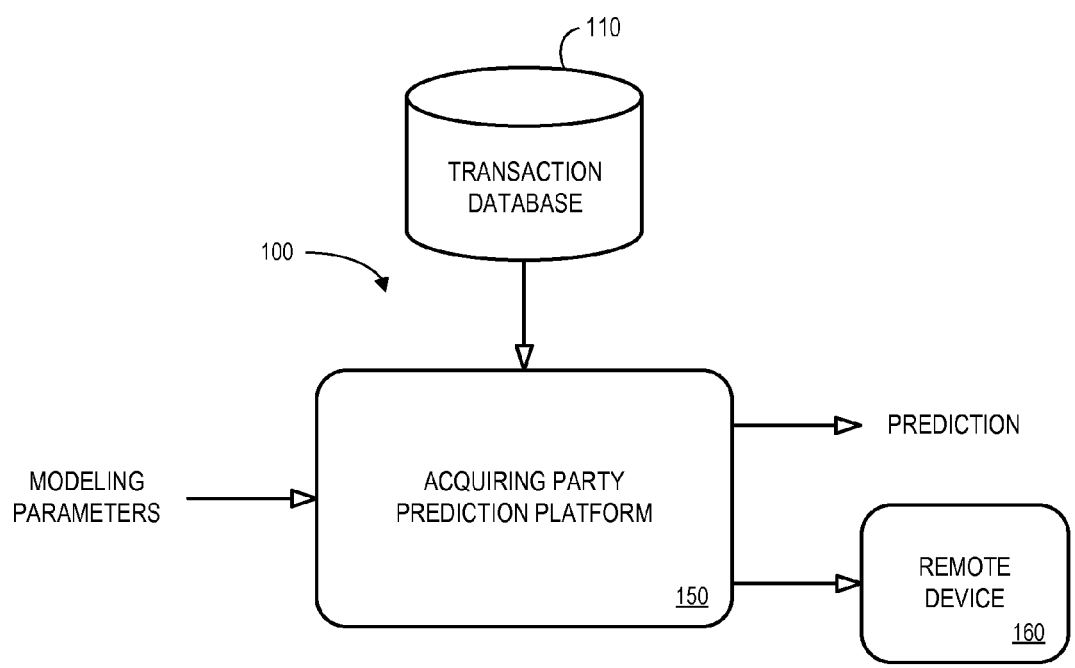
FIG. 1 is a block diagram overview of a system according to some embodiments of the present invention.

FIG. 1 is block diagram of a system 100 according to some embodiments of the present invention. In particular, the system 100 includes an acquiring party prediction platform 150 that receives information about payment transactions. The transactions may be associated with, for example, customers who make purchases from one or more merchants. The transaction information may be received, according to some embodiments, from a remote merchant device, via a credit card network, or from a transaction database 110 (e.g., associated with a clearing data warehouse).

The acquiring party prediction platform 150 may operate in any of the ways described herein, e.g., in accordance with a set of modeling parameters, and output a prediction that an acquiring party may have transaction volume below a threshold volume in the future. The acquiring party prediction platform 150 might be associated with, for example, a Personal Computer (PC), laptop computer, an enterprise server, a server farm, and/or a database or similar storage devices. The acquiring party prediction platform 150 may, according to some embodiments, be associated with a credit card company. According to some embodiments, an "automated" acquiring party prediction platform 150 facilitates the generation of predictions. For example, the acquiring party prediction platform 150 may automatically respond to requests received from a number of different acquiring banks (including those who process transactions for online merchants). As used herein, the term "automated" may refer to, for example, actions that can be performed with little (or no) human intervention.

As used herein, devices, including those associated with the acquiring party prediction platform 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Although a single acquiring party prediction platform 150 is shown in FIG. 1, any number of such devices may be included. Moreover, various devices described herein might be combined according to embodiments of the present invention. For example, in some embodiments, the acquiring party prediction platform 150 and a business rules and logic database might be co-located and/or may comprise a single apparatus.

In accordance with some embodiments, the systems and methods described herein provide a framework to predict information about a merchant's future use of an acquiring party to processes payment card transactions. For example, a payment card may presented by a cardholder (e.g., the account owner) to make a payment to a merchant. By way of example, and without limiting the generality of the foregoing, a payment card can be a credit card, debit card, charge card, stored-value card, or prepaid card or nearly any other type of financial transaction card. Further, as used herein in, the term "issuer" or "attribute provider" can include, for example, a financial institution (i.e., bank) issuing a card, a merchant issuing a merchant specific card, a stand-in processor configured to act on-behalf of the card-issuer, or any other suitable institution configured to issue a payment card. As used herein, the term "transaction" can be associated with, for example, a merchant, a merchant terminal, an automated teller machine (ATM), or any other suitable institution or device configured to initiate a financial transaction per the request of the account owner.

The information exchanged with the acquiring party prediction platform 150 may be associated with, for example, a "payment card processing system" or "credit card processing network," such as the MasterCard® network that allows account owners to use payment cards issued by a variety of issuers to shop at a variety of merchants. With this type of payment card, a card issuer or attribute provider, such as a bank, extends credit to an account owner to purchase products or services. When an account owner makes a purchase from an approved merchant, the card number and amount of the purchase, along with other relevant information, are transmitted via the processing network to an acquiring party, which may, for example, verifies that the card has not been reported lost or stolen and that the card's credit limit has not been exceeded. In some cases, the account owner's signature is also verified, a personal identification number is required or other user authentication mechanisms are imposed. The account owner is required to repay the bank for the purchases, generally on a monthly basis.

In accordance with some embodiments, the transaction data received by the acquiring party prediction platform 150 may include, for example, a sales amount for a payment card transaction including the type of goods and/or services sold, a total number of goods and/or services sold in the transaction, a total sales amount for the transaction (e.g., gross dollar amount), and an indication of which acquiring bank was used to process the transactions. In addition, depending on the merchant and/or business, the data associated with the transaction may include a point-of-sale or point-of-purchase (e.g., location of each payment card transaction). The point-of-sale or point-of-purchase provides that, for merchants and/or businesses having one or more locations, the location of the merchant and/or business that generated the sale can be identified.

Figure 2:
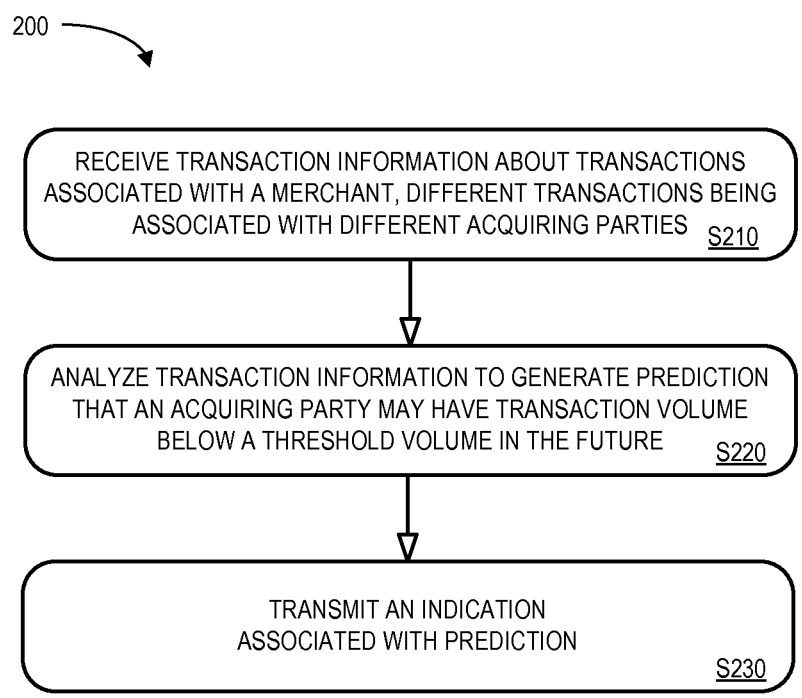
FIG. 2 illustrates a method that might be performed in accordance with some embodiments.

FIG. 2 illustrates a method 200 that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, transaction information associated with purchases made by customers from a merchant may be received by an acquiring party prediction platform. The transaction information might be associated with payment accounts such as, for example, a credit card account, a debit card account, a bank account, a pre-paid card account, or any other type of payment account. The transaction information may include, for example, an account identifier, a merchant identifier, a date, a time of day, a payment amount, a payment description, an indication of which acquiring bank was used to process the payment, and/or any other type of transaction information. Note that the transaction information might be received via a credit card network. According to some embodiments, the transaction information is associated with an online purchase, such as a purchase being made via an electronic shopping cart associated with the merchant and/or an electronic wallet account. Note that the transaction information will include data about a plurality of transactions associated with a merchant, and different transactions may be associated with different acquiring parties.

Responsive to the received transaction information, at S220 the acquiring party prediction platform may automatically analyze the transaction information to generate a prediction that a particular acquiring party may be associated with a transaction "volume" below a threshold volume in the future. As used herein, the phrase transaction volume might refer to, for example, a monetary amount, a number of transactions, and/or a share of transactions (or monetary amount) as compared to the other acquiring parties. According to some embodiments, the prediction may further based on a merchant industry, a total volume processed in an observation period (e.g., month or quarter), and/or information associated with other merchants. Note that the prediction may, according to some embodiments, be based at least in part on an autoregressive moving average, an autoregressive integrated moving average, and/or exogenous covariates.

At S230, an indication associated with the prediction may be transmitted. For example, a score, a flag, and/or) a probability might be transmitted via a report, a display, and/or an electronic message to let the acquiring party know that a merchant is likely to stop them to process payment transaction (e.g., during the next year, month, quarter, etc.).

Figure 3:
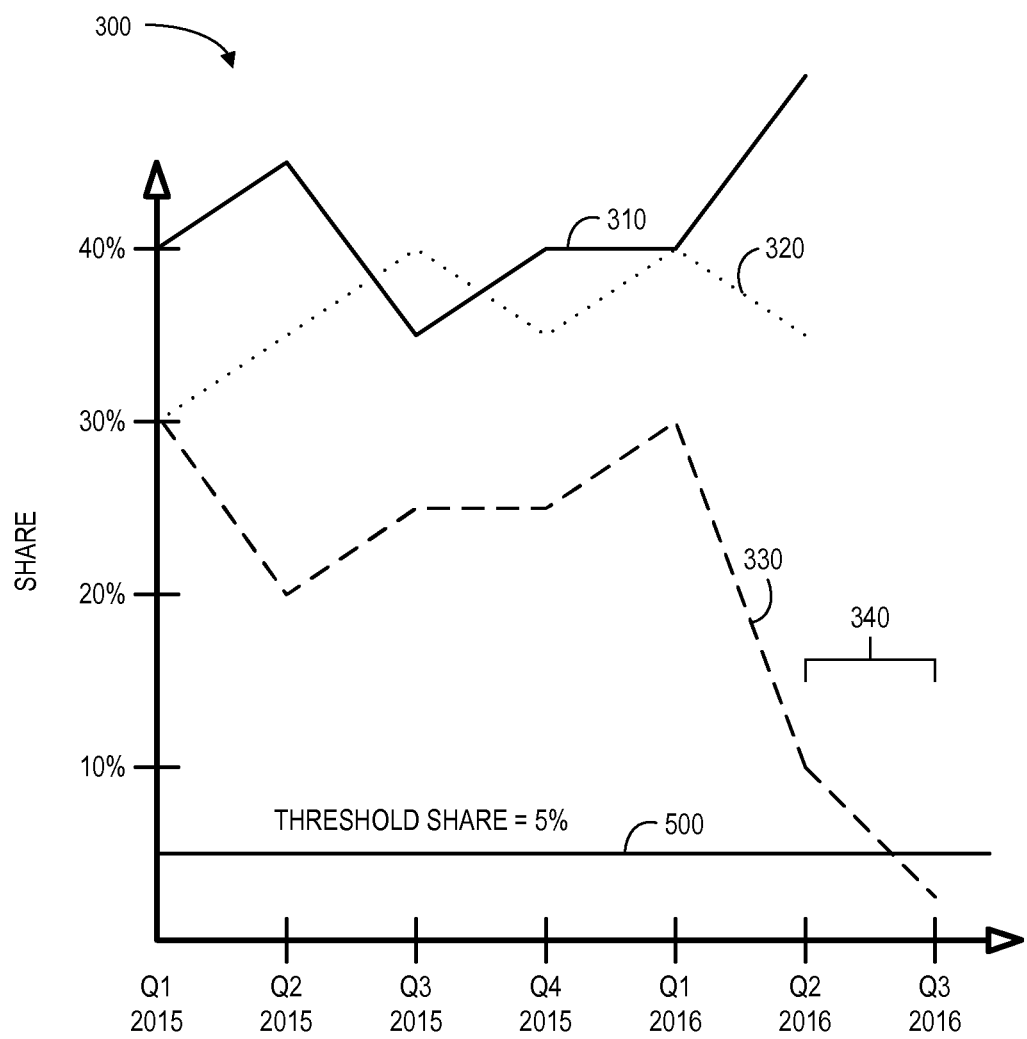
FIG. 3 is a graph illustrating transaction volumes in accordance with some embodiments.

Consider, for example, a supermarket that uses three different acquiring banks to process payment transactions. FIG. 3 is a graph 300 illustrating transaction volumes (as a share of overall transaction volume) for the supermarket over time (including actual transaction data from the first quarter of 2015 through the second quarter of 2016) Note that a first acquiring bank's share of transactions 310 (illustrated by a solid line in FIG. 3), a second acquiring bank's share of transactions 320 (illustrated by a dotted line), a third acquiring bank's share of transactions 330 (illustrated by a dashed line) all vary over time. In this example, an acquiring party prediction platform may analyzing the information in the graph to determine whether the third acquiring bank's share of transaction is likely to fall below a threshold value of 5% in a future period of time 340 (from the second quarter of 2016 to the third quarter of 2016). If so, a warning may be generated and transmitted to the third acquiring bank. In this way, the third acquiring bank may be able to take the steps necessary to avoid losing the merchant's business (e.g., be re-negotiating a fee structure).

Figure 4:
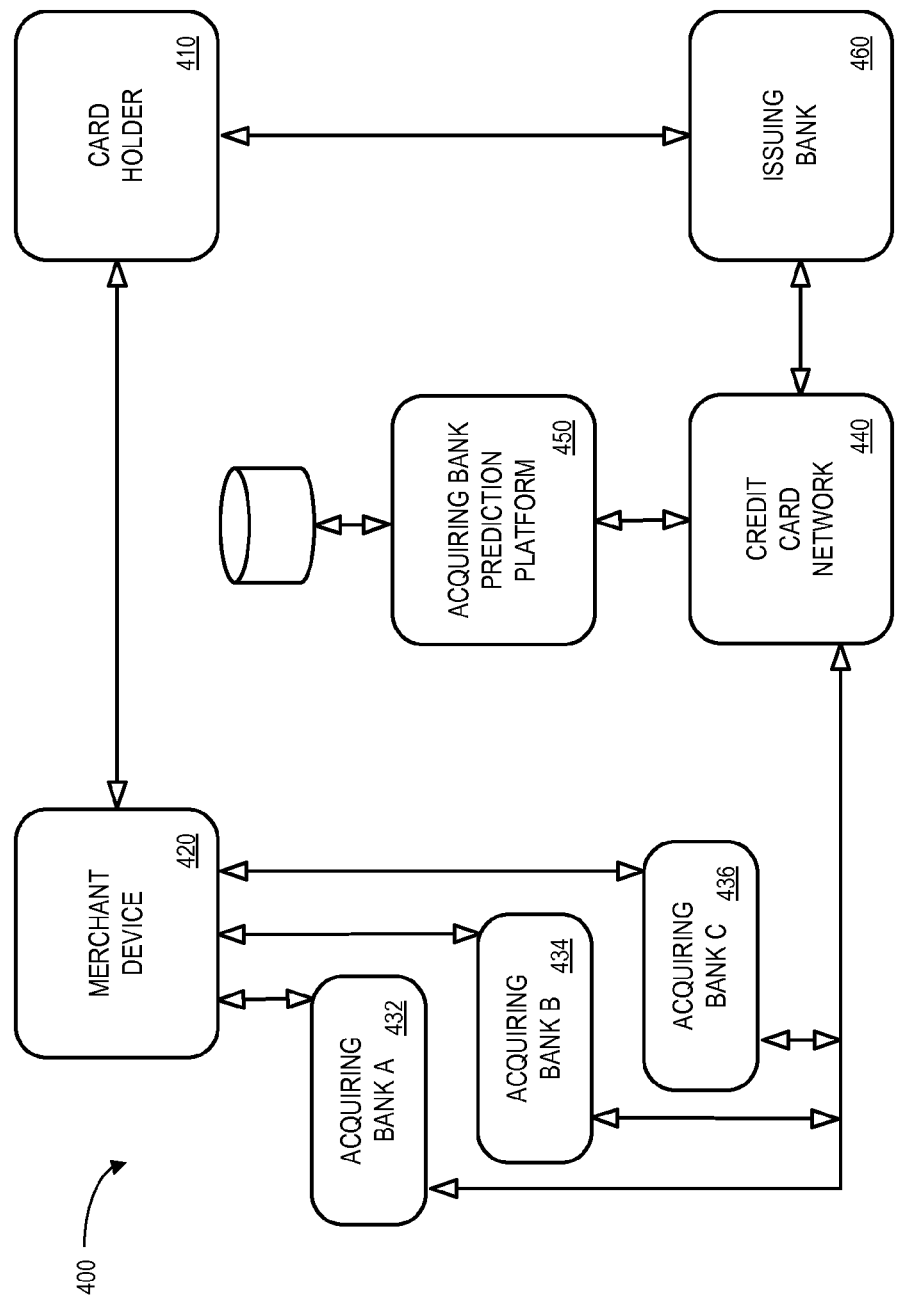
FIG. 4 is a high level overview of a system in accordance with some embodiments.

FIG. 4 is a high level overview of a system 400 in accordance with some embodiments. According to this embodiment, a card holder 410 may interact with a merchant device 420 that process the transactions through a credit card network 440 via three different acquiring banks 432, 434, 436. Moreover, the credit card network 440 may exchange information with an acquiring bank prediction platform 450 and facilitate settlement of the card holder's purchase via an issuing bank 460. According to some embodiments, the system 400 allows one or more of the acquiring banks 432, 434, 436 realize that a merchant is likely to stop using one acquiring bank while still using other acquiring banks in the future.

Note that the credit card network 440 may be aware of the total volume of transactions that are processed across all of the acquiring banks 432, 434, 436 and therefore can measure trends in the share of volume processed by any particular acquiring bank 432, 434, 436. For example, acquiring bank C 436 might be aware that the overall number of transactions it has processed over the last month is down 10% but it cannot determine if that is because the merchant's overall sales have decreased or because the merchant is shifting transactions to the other two acquiring banks 432, 434.

Figure 5:
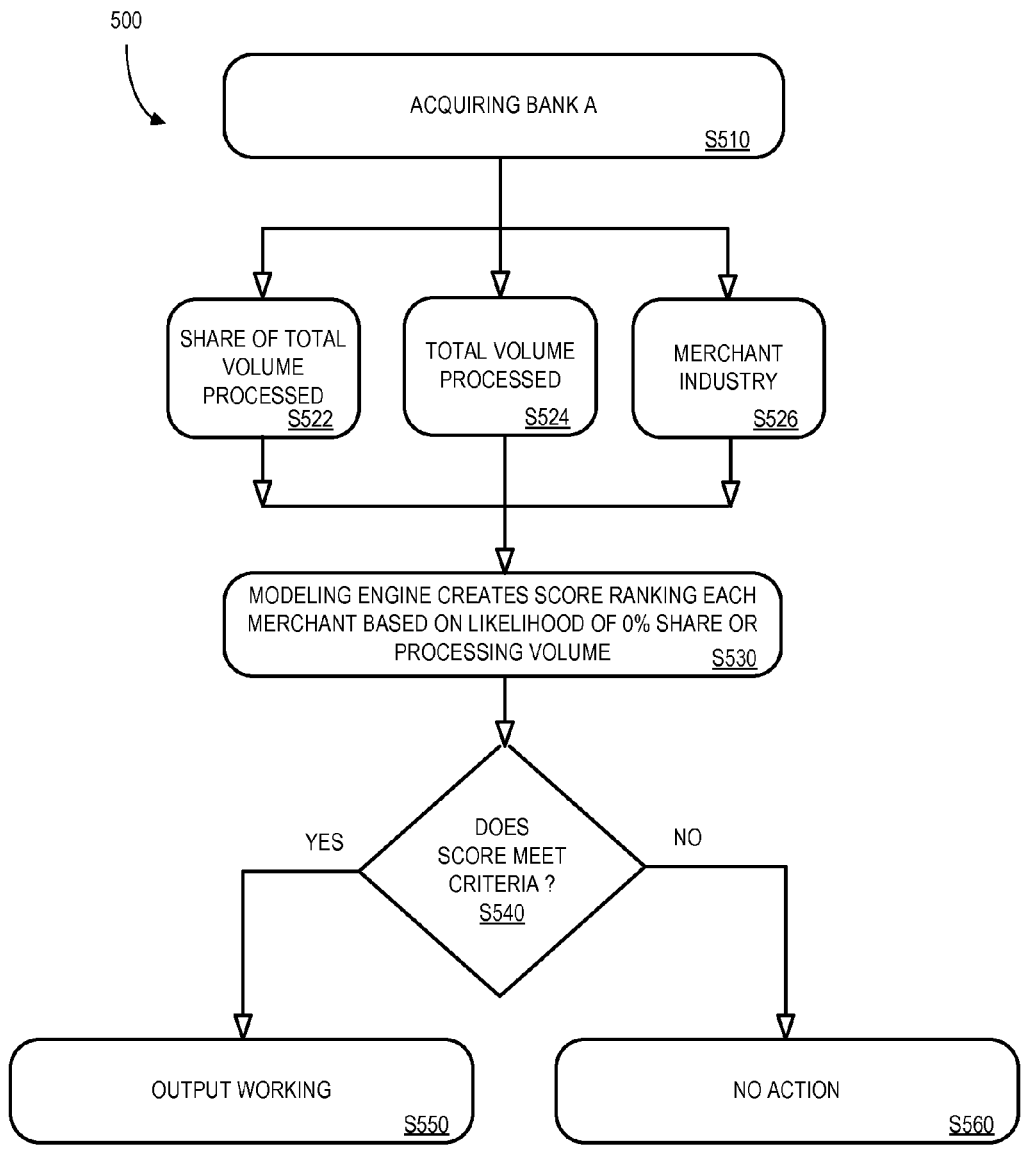
FIG. 5 illustrates a more detailed method that might be performed in accordance with some embodiments.

FIG. 5 is an example of a process that might be performed by the acquiring bank prediction platform 450 of FIG. 4. In particular, at S510 the acquiring bank prediction platform 450 may analyze data associated with acquiring bank A. For example, the share of total volume processed S522, the total volume of transactions processed S524, and/or overall merchant industry data S526 may be analyzed.

A modeling engine may then create a score at S530. For example, the score might rank each merchant served by acquiring bank A based on a likelihood that the merchant will stop using it to process transactions (e.g., that transactions have been shifted to other acquiring banks) According to some embodiments, the score created at S530 is based at least in part on overall merchant industry information, the total volume of transactions that were processed in an observation period, and/or a change in share of the total volume processed by acquiring bank A.

The score created at S530 may be based at least in part on an autoregressive moving average and/or an autoregressive integrated moving average, such as an ARIMAX(p, D, q) model on a time series of the share of total volume of payment transactions that were processed. The autoregressive moving average model may include exogenous covariates, ARMAX(p, q), that extend the ARMA(p, q) model by including the linear effect that one or more exogenous series has on the stationary response series $y_t$. The general form of the ARMAX(p, q) model is:

$$y_t = \Sigma_{i=1}^{p} \phi_i y_{t-i} + \Sigma_{k=1}^{r} \beta_k x_{tk} + \epsilon_t + \Sigma_{j=1}^{q} \theta_j \epsilon_{t-j}$$

and a condensed form in a lag operator notation may be represented by the formula:

$$\phi(L) y_t = c + x'_t \beta + \theta(L) \epsilon_t$$

In the condensed form in lag operator notation formula above, the vector $x'_t$ may hold the values of the r exogenous, time-varying predictors at time t, with coefficients denoted as $\beta$.

According to some embodiments, an interface to the model block may allow for control parameters, such as the forecast horizon, p, q, and exogenous factors (D). Moreover, the ARIMAX(p, D, q) model may be used to introduce the exogenous variables, such as merchant industry data and the total volume of payment transactions that have been processed.

Note that conventions and extensions may be associated with the ARIMAX(p, D, q) model, and that ARMAX models may have the same stationarity requirements as ARMA models. Specifically, the response series may be stable if the roots of the homogeneous characteristic equation of:

$$\phi(L) = L^p - \phi_1 L^{p-1} - \phi_2 L^{p-2} - \ldots - \phi_p$$

lie inside of the unit circle. According to some embodiments, if the response series $y_t$ is not stable, it may be differenced to form a stationary ARIMA model. This might be done, for example, by specifying the degrees of integration D.

The ARIMA model software differences the response series $y_t$ before including the exogenous covariates if the degree of integration D is specified. In other words, the exogenous covariates enter a model with a stationary response. Therefore, the ARIMAX(p, D, q) model is:

$$\phi(L) y_t = c^* + x'_t \beta + \theta^*(L) \epsilon_t$$

where $c^* = c/(1-L)^D$ and $\theta^*(L) = \theta(L)/(1-L)^D$. Subsequently, the interpretation of $\beta$ may be changed to the expected effect a unit increase in the predictor has on the difference between current and lagged values of the response (conditional on those lagged values).

The predictor series $x_t$ may be assessed to determine whether they are stationary. Difference all predictor series that are not stationary with differences during the data preprocessing stage. Note that if $x_t$ is nonstationary, then a test for the significance of $\beta$ may produce a false negative. The practical interpretation of $\beta$ may change if the predictor series is differenced. According to some embodiments, the ARIMA model software uses a maximum likelihood estimation for conditional mean models such as ARIMAX models. Note that ARIMAX(p, D, q) model software is commercially available, for example, from MATHWORKS® of Natick, Mass., U.S.A.

Figure 6:
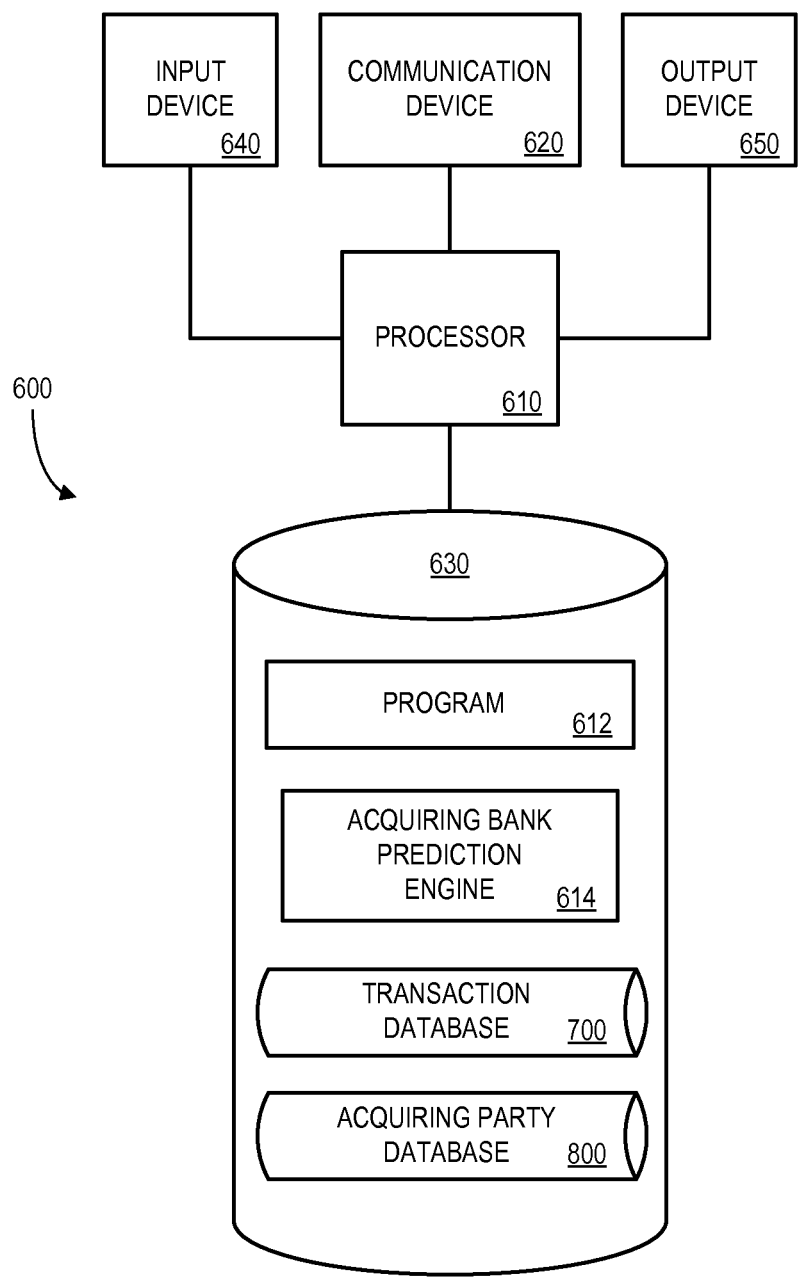
FIG. 6 is block diagram of an acquiring party prediction platform according to some embodiments of the present invention.

Note that the embodiments described herein may be implemented using any number of different hardware configurations. For example, FIG. 6 illustrates an acquiring party prediction platform 600 that may be, for example, associated with the systems 100, 400 of FIGS. 1 and 4. The acquiring party prediction platform 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more transaction databases. The acquiring party prediction platform 600 further includes an input device 640 (e.g., a computer mouse and/or keyboard to enter information about model parameters and/or business rules or logic) and an output device 650 (e.g., a computer monitor or printer to output a reports and/or support user interfaces).

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or an acquiring bank prediction engine 614 for controlling the processor 610. The processor 610 performs instructions of the programs 612, 614, and thereby operates in accordance with any of the embodiments described herein. For example, the processor 610 may receive transaction information about purchases made by customers from a merchant. Responsive to the received transaction information, the processor 610 may automatically analyzing the transaction information to generate a prediction that a particular acquiring party may be associated with a transaction volume below a threshold volume in the future. An indication associated with the prediction may then be transmitted by the processor 610.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the acquiring party prediction platform 600 from another device; or (ii) a software application or module within the acquiring party prediction platform 600 from another software application, module, or any other source.

In some embodiments (such as shown in FIG. 6), the storage device 630 further stores a transaction data base 700 and an acquiring party database 800. Some examples of databases that may be used in connection with the acquiring party prediction platform 600 will now be described in detail with respect to FIGS. 7 through 9. Note that the databases described herein are only examples, and additional and/or different information may actually be stored therein. Moreover, various databases might be split or combined in accordance with any of the embodiments described herein. For example, the transaction database 700 and the acquiring party database 800 might be combined and/or linked to each other within the acquiring party prediction platform 600.

Note that according to some embodiments the storage device 630 may further store a "business classification," which is a group of merchants and/or businesses, by the type of goods and/or service the merchant and/or business provides. For example, the group of merchants and/or businesses can include merchants and/or business that provide similar goods and/or services. In addition, the merchants and/or businesses can be classified based on geographical location, sales, and any other type of classification, which can be used to associate a merchant and/or business with similar goods, services, locations, economic and/or business sector, industry and/or industry group.

Similarly, the storage device 630 might store a Merchant Category Code ("MCC") which is a four-digit number created by MasterCard® or VISA® and assigned to a business by the acquirer when the business first starts accepting one of these cards as a form of payment. The MCC is used to classify the business by the type of goods or services it provides. For example, in the United States, the merchant category code can be used to determine if a payment needs to be reported to the IRS for tax purposes. In addition, MCCs are used by card issuers to categorize, track or restrict certain types of purchases.

The business classification and/or MCC might be used to apply different business rules and logic to model decisions. For example, a threshold value that is used for an automobile dealership might different than a threshold value that is applied to a casino's payment transaction.

Figure 7:
FIG. 7 is a tabular portion of a transaction database in accordance with some embodiments.

Referring to FIG. 7, a table is shown that represents the transaction database 700 that may be stored at the acquiring party prediction platform 600 according to some embodiments. The table may include, for example, entries identifying transactions that have been processed via payment accounts (e.g., credit card transactions). The table may also define fields 702, 704, 706, 708, 710, 712, 714, 716 for each of the entries. The fields 702, 704, 706, 708, 710, 712, 714, 716 may, according to some embodiments, specify: a transaction identifier 702, a payment identifier 704, a merchant identifier 706, an acquiring party identifier 708, a date and time 710, an issuing bank identifier 712, an amount 714, and a cardholder name 716. The transaction database 700 may be created and updated, for example, as merchant devices, credit card network requests, and/or online electronic wallets are used to provide transaction information.

The transaction identifier 702 may be associated with a particular transaction (e.g., a purchase at a supermarket). According to some embodiments, the payment identifier 704 may also be stored, such as a unique alphanumeric code identifying a payment account or a Primary Account Number ("PAN"). The merchant identifier 706 may indicate which merchant submitted the transaction information, and the acquiring party identifier 708 might indicate which bank was used to process the transaction. The date and time 710 may indicate when the transaction occurred, the issuing bank identifier 712 may represent the customer's bank, and the amount 714 may indicate the total monetary amount of the transaction. The cardholder name 716 may indicate who made each transaction.

Figure 8:
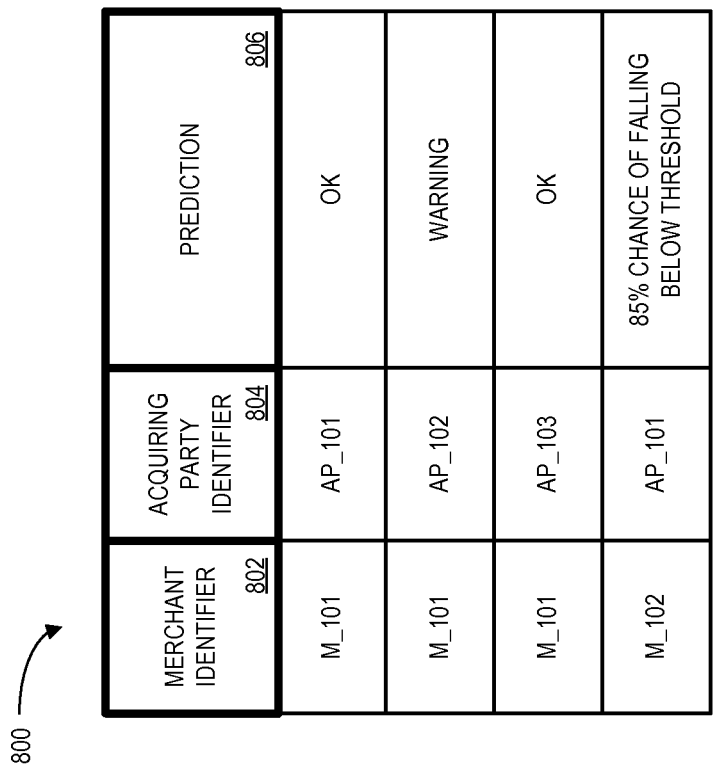
FIG. 8 is a tabular portion of an acquiring party database according to some embodiments.

Referring to FIG. 8, a table is shown that represents the acquiring party database 800 that may be stored at the acquiring party prediction platform 800 according to some embodiments. The table may include, for example, entries identifying merchants. The table may also define fields 802, 804, 806 for each of the entries. The fields 802, 804, 806 may, according to some embodiments, specify: a merchant identifier 802, an acquiring party identifier 804, and a prediction 806. The acquiring party database 800 may be updated, for example, as transactions are processed by a credit card network (and may be in substantially real time or on a periodic basis).

The merchant identifier 802 may be, for example, a unique alphanumeric code identifying a merchant, and the acquiring party identifier 804 may indicate the banks used by that merchant to process payment transactions. For example, merchant "M_101" in FIG. 8 uses three different banks: "AP_101," "AP_102," and "AP_103." The prediction 806 may comprise the output of any of the models described herein. For example, the prediction 806 might comprise a "warning" that merchant "M_101" seems to be about to drop "AP_102" as an acquiring bank to process payment transactions. According to some embodiments, the predication 806 might include a probability indicating how likely such a result is in view of all of the factors that are considered by the system.

Figure 9:
FIG. 9 is a tabular portion of an acquiring party database according to another embodiment.

FIG. 8 illustrates data that is grouped based on the merchant. FIG. 9 illustrates a very similar acquiring party database 900 that is instead grouped by an acquiring party identifier 904. That is acquiring party "AP_101" may server three different merchants, having merchant identifiers 902 of "M_101," "M_102," and "M_103." As before a prediction may represent the output of any of the models described herein. In the example of FIG. 9, the merchants are graded and/or classified into different groups based on the risk that they will completely stop using "AP_101."

Figure 10:
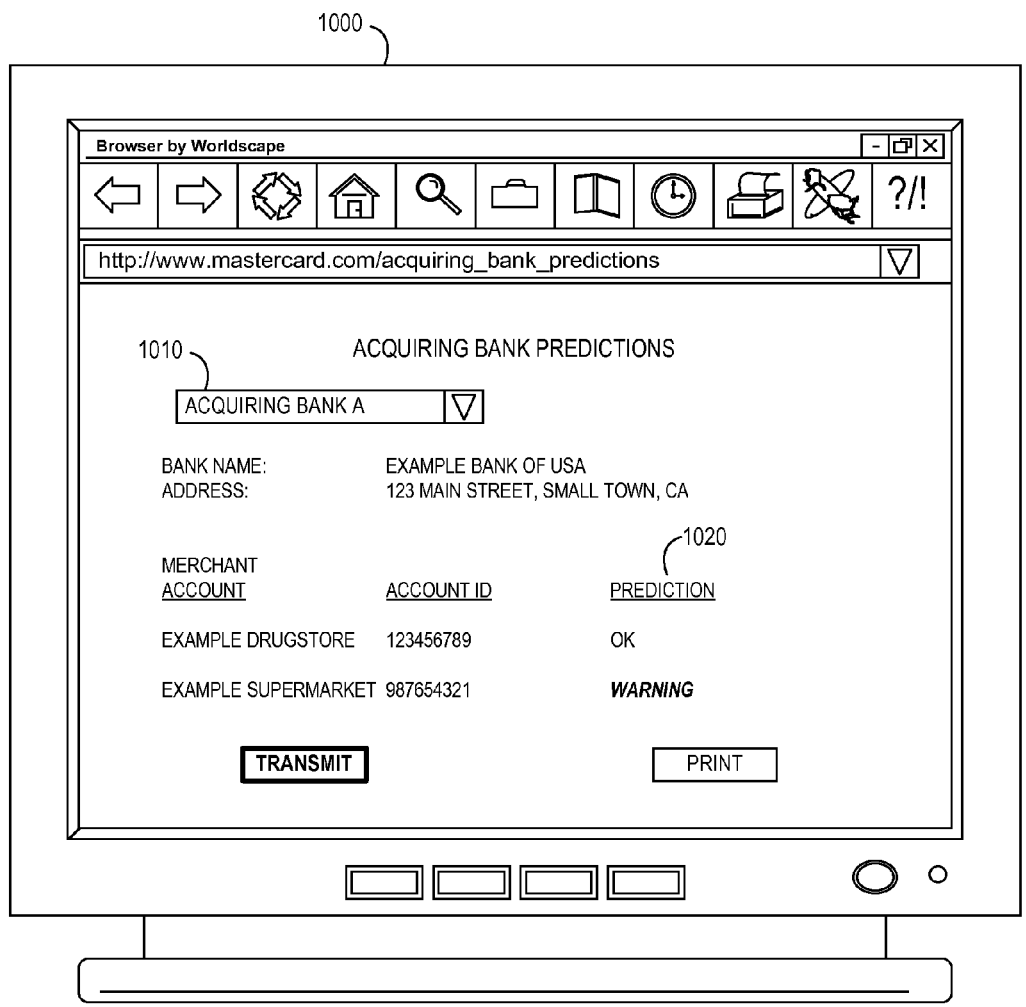
FIG. 10 illustrates an acquiring party prediction display according to some embodiments.

FIG. 10 illustrates an acquiring party prediction display 1000 according to some embodiments. In this example, the display 1000 includes a selection portion 1010 that can be used to select one or more acquiring banks. An output area 1020 of the display may then indicate one or more warnings that have been generated in connection with that bank's merchants.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system, comprising:
    a payment card network device to process transaction information about a plurality of transactions originating from a merchant server, different transactions being received via different acquiring institution devices;
    a transaction database storing indications of the plurality of transactions;
    an acquiring institution database storing information associated with the different acquiring institution devices;

an acquiring institution prediction platform server coupled to the payment card network device, the transaction database, and the acquiring institution database, the acquiring institution prediction platform server including:
a communication device to receive data,
a computer processor for executing program instructions, and
a memory, coupled to the computer processor, for storing program instructions for execution by the computer processor to:
access the transaction information in the transaction database,
automatically analyze the transaction information and information in the acquiring institution database to generate a prediction that a particular acquiring institution may be associated with a transaction volume below a threshold volume in the future while other acquiring institutions processing transactions for the merchant will not be associated with lower transaction volumes, and
transmit via a communication network an indication associated with said prediction; and
a remote display device to receive the indication associated with said prediction via the communication network and to provide an interactive graphical user interface display including, for the particular acquiring institution:
a plurality of merchant account identifiers,
proximate to each merchant account identifier, an associated indication related to said prediction, and
a user selectable input that, when selected by the user, automatically adjusts the acquiring institution displayed on the graphical user interface.

2. The system of claim 1, wherein the transaction information includes at least one of: (i) a transaction identifier, (ii) a payment identifier, (iii) an acquiring bank identifier, (iv) a credit card network identifier, (v) an issuing bank identifier, (vi) a transaction amount, and (vii) a time and date.

3. The system of claim 1, wherein the transaction volume is associated with at least one of: (i) a monetary amount, (ii) a number of transactions, and (iii) a share of transactions as compared to the other acquiring institutions.

4. The system of claim 1, wherein the prediction is further based on at least one of: (i) a merchant industry, (ii) a total volume processed in an observation period, and (iii) information associated with other merchants.

5. The system of claim 1, wherein the transmitted indication is associated with at least one of: (i) a score, (ii) a flag, and (iii) a probability.

6. The system of claim 1, wherein said predicting is based on at least one of: (i) an autoregressive moving average, (ii) an autoregressive integrated moving average, and (iii) exogenous covariates.

7. The system of claim 1, wherein said transmitting is further associated with at least one of: (i) a report, and (ii) an electronic message.

8. A computer implemented method, comprising:
storing into a transaction database transaction information about a plurality of transactions originating from a merchant server, different transactions being received via different acquiring institution devices and processed by a payment card network device;
storing into an acquiring institution database information associated with the different acquiring institution devices;
accessing, by a computer processor of an acquiring institution prediction platform server, transaction information in the transaction database;
automatically analyzing, by the computer processor of the acquiring institution prediction platform server, the transaction information and information in the acquiring institution database to generate a prediction that a particular acquiring institution may be associated with a transaction volume below a threshold volume in the future while other acquiring institutions processing transactions for the merchant will not be associated with lower transaction volumes;
transmitting, from the computer processor of the acquiring institution prediction platform server via a communication network, an indication associated with said prediction;
receiving, via the communication network, the indication associated with said prediction at a remote display device;
presenting to a user an interactive graphical user interface display, including, for the particular acquiring institution:
a plurality of merchant account identifiers,
proximate to each merchant account identifier, an associated indication related to said prediction, and
a user selectable input that, when selected by the user, automatically adjusts the acquiring institution displayed on the graphical user interface.

9. The method of claim 8, wherein the transaction information includes at least one of: (i) a transaction identifier, (ii) a payment identifier, (iii) an acquiring bank identifier, (iv) a credit card network identifier, (v) an issuing bank identifier, (vi) a transaction amount, and (vii) a time and date.

10. The method of claim 8, wherein the transaction volume is associated with at least one of: (i) a monetary amount, (ii) a number of transactions, and (iii) a share of transactions as compared to the other acquiring institutions.

11. The method of claim 8, wherein the prediction is further based on at least one of: (i) a merchant industry, (ii) a total volume processed in an observation period, and (iii) information associated with other merchants.

12. The method of claim 8, wherein the transmitted indication is associated with at least one of: (i) a score, (ii) a flag, and (iii) a probability.

13. The method of claim 8, wherein said predicting is based on at least one of: (i) an autoregressive moving average, (ii) an autoregressive integrated moving average, and (iii) exogenous covariates.

14. The method of claim 8, wherein said transmitting is further associated with at least one of: (i) a report and (ii) an electronic message.

15. A non-transitory, computer-readable medium having stored therein instructions that, upon execution, cause a computer processor to perform a method, the method comprising:
storing into a transaction database transaction information about a plurality of transactions originating from a merchant server, different transactions being received via different acquiring institution devices and processed by a payment card network device;
storing into an acquiring institution database information associated with the different acquiring institution devices;
accessing, by a computer processor of an acquiring institution prediction platform server, transaction information in the transaction database;

automatically analyzing, by the computer processor of the acquiring institution prediction platform server, the transaction information and information in the acquiring institution database to generate a prediction that a particular acquiring institution may be associated with a transaction volume below a threshold volume in the future while other acquiring institutions processing transactions for the merchant will not be associated with lower transaction volumes;

transmitting, from the computer processor of the acquiring institution prediction platform server via a communication network, an indication associated with said prediction;

receiving, via the communication network, the indication associated with said prediction at a remote display device;

presenting to a user an interactive graphical user interface display, including, for the particular acquiring institution:
- a plurality of merchant account identifiers, and
- proximate to each merchant account identifier, an associated indication related to said prediction, and
- a user selectable input that, when selected by the user, automatically adjusts the acquiring institution displayed on the graphical user interface.

16. The medium of claim 15, wherein the transaction information includes at least one of: (i) a transaction identifier, (ii) a payment identifier, (iii) an acquiring bank identifier, (iv) a credit card network identifier, (v) an issuing bank identifier, (vi) a transaction amount, and (vii) a time and date.

17. The medium of claim 15, wherein the transaction volume is associated with at least one of: (i) a monetary amount, (ii) a number of transactions, and (iii) a share of transactions as compared to the other acquiring institutions.

18. The medium of claim 15, wherein the prediction is further based on at least one of: (i) a merchant industry, (ii) a total volume processed in an observation period, and (iii) information associated with other merchants.

19. The medium of claim 15, wherein the transmitted indication is associated with at least one of: (i) a score, (ii) a flag, and (iii) a probability.

20. The medium of claim 15, wherein said predicting is based on at least one of: (i) an autoregressive moving average, (ii) an autoregressive integrated moving average, and (iii) exogenous covariates.

21. The medium of claim 15, wherein said transmitting is further associated with at least one of: (i) a report and (ii) an electronic message.

* * * * *